United States Patent
Hölzle et al.

(10) Patent No.: US 6,553,426 B2
(45) Date of Patent: Apr. 22, 2003

(54) METHOD APPARATUS FOR IMPLEMENTING MULTIPLE RETURN SITES

(75) Inventors: Urs Hölzle, Goleta, CA (US); Robert Griesemer, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/944,326

(22) Filed: Oct. 6, 1997

(65) Prior Publication Data

US 2002/0062400 A1 May 23, 2002

(51) Int. Cl.[7] .................................................. G06F 9/42
(52) U.S. Cl. .......................... 709/310; 712/236; 709/1
(58) Field of Search .................... 709/330, 1, 310–320; 714/51; 712/236

(56) References Cited

U.S. PATENT DOCUMENTS

5,515,519 A * 5/1996 Yoshioka et al. ............ 712/234
5,687,349 A * 11/1997 McGarity .................... 711/137

FOREIGN PATENT DOCUMENTS

| EP | 000565194 A1 | * 10/1993 | G06F/9/42 |
| EP | 0742513 A2 | * 11/1996 | G06F/9/42 |
| JP | 58056153 | 4/1983 | |

OTHER PUBLICATIONS

Lindholm et al., "The Java Virtual Machine Specification, Second Edition", 1999, Addison–Wesley, Chapters 1–4.
Lemaire et al., "Fast Return Branch", vol. 24, No. 11B, Apr. 1982, IBM Technical Disclosure Bulletin, pp. 6179–6183.
Helvig et al., "Exception Condition Sequencer", vol. 22, No. 4, Sep. 1979, IBM Technical Disclosure Bulletin, pp. 1627–1634.

* cited by examiner

Primary Examiner—St. John Courtenay, III
(74) Attorney, Agent, or Firm—Beyer Weaver & Thomas LLP

(57) ABSTRACT

Methods and apparatus for efficiently enabling an alternate return address associated with a function call to essentially be stored such that the alternate return address may be readily accessed are disclosed. According to one aspect of the present invention, a method for enabling a return address associated with a function called by a routine to be efficiently stored includes calling the function from within the routine while the routine is executing. In general, the function is external to the routine. The function, once called, begins executing. Eventually, the function returns to the routine. Specifically, the function returns to a location in the routine that is identified by an expected return point, or normal return address. The instruction in the routine that corresponds to the expected return point is a dummy instruction that executes with a low computational overhead but does not affect program execution. When the called function is to return to an alternate return point, it obtains the address by reading data embedded in the dummy instruction.

18 Claims, 8 Drawing Sheets

METHOD APPARATUS FOR IMPLEMENTING MULTIPLE RETURN SITES

CROSS REFERENCE TO RELATED APPLICATIONS

This application is related to U.S. patent application Ser. No. 08/944,332, entitled "Inline Database for Receiver Types in Object-Oriented Systems," U.S. patent application Ser. No. 08/944,735, entitled "Method and Apparatus for Performing Byte-Code Optimization During Pauses, U.S. patent application Ser. No. 08/944,335, entitled "Mixed Execution Stack and Exception Handling," U.S. patent application Ser. No. 08/944,331, entitled "Site Specific Message Dispatch in Object-Oriented Systems," U.S. patent application Ser. No. 08/944,334, entitled "Method and Apparatus for Dynamically Optimizing Byte-Coded Programs," U.S. patent application Ser. No. 08/944,330, entitled "Method and Apparatus for Dynamically Optimizing Compiled Activations," all filed concurrently herewith, U.S. patent application Ser. No. 08/884,856, entitled "Interpreting Functions Utilizing a Hybrid of Virtual and Native Machine Instructions," filed Jun. 30, 1997, and U.S. patent application Ser. No. 08/885,008, entitled "Interpreter Generation and Implementation Utilizing Interpreter States and Register Caching," filed Jun. 30, 1997, which are all incorporated herein by reference for all purposes in their entirety.

BACKGROUND OF THE INVENTION

1. Field of Invention

The present invention relates generally to methods and apparatus for implementing multiple return points for a call to a function. More particularly, the present invention relates to method and apparatus for efficiently enabling addresses for multiple return points to be obtained.

2. Description of the Relevant Art

Computer systems are often linked across a network, e.g., local area networks, intranets, and internets, of computer systems such that they may share resources such as software, or program, code. Further, many programs, which include routines, are written such that a program calls "external" functions which may not be included within the program. In general, the functions may be shared by many routines, thereby allowing computer system resources to be used more efficiently.

When a routine is arranged to call functions, the functions that are called must eventually return into the routine. Further, the returns to the routine must be made to the appropriate locations within the routine. With reference to FIG. 1, the flow between a computer program and functions called by the program will be described. Computer code 104 includes a routine g( ) 108. Routine g( ) 108 includes instructions which are executed. As shown, the instructions include repeated calls 112 to a function f( ) 116.

When function f( ) 116 is called and executes "normally," e.g., no exception is thrown, then function f( ) 116 typically completes execution, and a return is made to routine g( ) 108a computer routine. The location within routine g( ) 108a computer routine to which function f( ) 116 returns is dependent upon the call site, or the site within routine g( ) 108a computer routine which called function f( ) 116. Specifically, if function f( ) 116 executes as a result of call 112a, then function f( ) 116 returns to return address 120 which, as will be appreciated by those skilled in the art, is located immediately after call 112a within routine g( ) 108a computer routine. Similarly, if function f( ) 116 executes when called by call 112b, then function f( ) 116 returns to return address 124. Once function f( ) 116 returns to routine g( ) 108a computer routine, routine g( ) 108a generally continues to execute.

Many functions may have more than one return site, or point. By way of example, a function may have a normal, or expected, return point as well as an alternate return point. Alternate return points are often considered to be "abnormal" return points such as return points associated with thrown exceptions. The alternate return points are typically stored, or cataloged, within an overall program such that the return points may be readily identified as needed. By way of example, alternate return points may be needed by a program during the processing of an exception thrown by a function which does not handle exceptions.

One mechanism used to associate functions with alternate return points is a return point, or return address, table. FIG. 2a is a diagrammatic representation of a return point table associated with a call stack. A call stack 204 includes a caller frame 208 which calls another frame, i.e., callee frame 212. Callee 212 is associated with a function f( ) 214. As such, when caller 208 calls callee 212, function f( ) 214 begins to execute.

At the end of the execution of function f( ) 214, function f( ) 214 and, hence, callee 212 returns to caller 208. When the return to caller 208 is not a normal return, then the normal return address may be used as an index 216 into a return point table 220 to identify the proper alternative return point. For example, if the normal return address is "1234", then return point table 220 may be searched to find "1234." Once "1234" is found, then the alternate return point address associated with "1234" may be obtained. As shown, for a normal return address of "1234," the corresponding alternate return point address is "1256." Once obtained, the alternate return point address may then be used to ensure that callee 212 returns to caller 208 appropriately.

Although the use of a return point table, which is generally a look-up table or a hash table, is effective to identify a proper return point for a callee, the implementation of a table look-up is often slow. A faster process for implementing multiple return points involves eliminating table look-ups to identify return points. As will be appreciated by those skilled in the art, during the execution of a function, it is essentially "known" to the function whether the function should return using a normal return, or whether the function should return using an alternate return. Therefore, data pertaining to the alternate return address is available to be stored.

FIG. 2b is a diagrammatic representation of a routine which is arranged to store alternate return address data. A routine g( ) 236 includes a call 238 to a function f( ). Regardless of whether call 238 to a function f( ) results in the need to return to an alternate address, call 238 would normally return to return address 240. Return address 240 identifies stored alternate return address data 242. The stored alternate return address data 242 is located within routine g( ) 236, a computer routine near call 238 to enable alternate return address data 242 to be readily accessed. In general, alternate return address data 242 is stored in the instruction stream itself. Since stored alternate return address data 242 may not represent a legal instruction, or may have undesirable side effects such as overwriting a value in a register or a memory cell, execution of routine g( ) may not continue at address 240 but must instead continue at next instruction 244.

When call 238 returns normally, call 238 should return to next instruction 244. As shown, within routine g( ) 236, next instruction 244 is offset from stored alternate return address data 242 by a distance D. Therefore, when call 238 returns normally, call 238 must return to a location that is specified by the location of return address 240 incremented by offset D, i.e., the location of next instruction 244. Typically, as distance D has a value of four bytes, next instruction 244 is offset from the location of return address 240 by four bytes.

While accessing a stored alternate return address in a program is more time-efficient than implementing a table look-up when an alternate return address is needed, when an alternate return address is not needed, the ability to access a stored alternate return address often adversely affects the performance of the program. Adding an offset to the location of a return address in order to locate a subsequent instruction to be executed when a function call returns normally is often relatively slow, and may incur a performance penalty associated with computing the location of the subsequent instruction. In other words, the speed associated with a normal return may be compromised by the implementation of stored alternate return addresses. Further, branch prediction which is often used to generate a "best-guess" estimate for a normal return, or a return which is most likely to occur, may be compromised by the use of jumps, as will be appreciated by those skilled in the art.

Alternatively, "jumps" may be used to bypass the stored alternate address, as follows. Jumps, or branches, are often included in programs, or routines, to bypass sections of code which may be unnecessary in some situations. For example, jumps may be implemented in a routine to enable a stored alternate return address to be bypassed when a function call returns normally, as shown in FIG. 2c. Within routine g( ) 266, a call 268 is made to a function f( ). When call 268 returns normally, the return is made to the location in routine g( ) 266 specified by a return address 270. The location corresponding to return address 270 is an instruction 272 to jump to a location L which is located at a fixed offset F from instruction 272. Therefore, when call 268 returns normally to return address 270, a jump is made to next instruction 274. Such a jump bypasses, or branches around, stored alternate return address data 276.

While the implementation of jumps may reduce performance penalties, e.g., hardware performance penalties, associated with adding an offset to a return address in order to find the location of a subsequent instruction, jumps may be slow. Additional code must be included in a program to allow for jumps, thereby increasing the overall size of the program.

As discussed above, conventional methods for implementing multiple return points for function calls are often slow and inefficient, and, hence, the implementation of multiple return points may adversely affect the performance of programs associated with the function calls. Therefore, what is desired is an efficient method and apparatus for implementing multiple return points such that both normal returns and alternate returns occur efficiently.

SUMMARY OF THE INVENTION

Methods and apparatus for efficiently enabling an alternate return address associated with a function call to essentially be cached such that the alternate return address may be readily accessed are disclosed. According to one aspect of the present invention, a method for enabling a return address associated with a function called by a routine to be efficiently cached includes calling the function from within the routine while the routine is executing. In general, the function is external to the routine. The function, once called, begins executing. Eventually, the function returns to the routine. Specifically, the function returns to a location in the routine that is identified by an expected return point, or normal return address. The instruction in the routine that corresponds to the expected return point is a "dummy" instruction that executes with a low computational overhead. The dummy instruction is selected to execute without affecting the normal program execution, i.e., its result is not used. Instead, the purpose of the dummy instruction is to encode the alternate return point, or points, in a suitable way.

In one embodiment, when the function returns to the routine in an expected manner, the execution of the function is completed prior to returning to the expected return point, and the execution of the dummy instruction has no effect. In another embodiment, when the function does return to the alternate return point, code is executed to access the dummy instruction stored at the normal return point, and the address of the alternate return point is computed from the library value that the dummy instruction represents.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
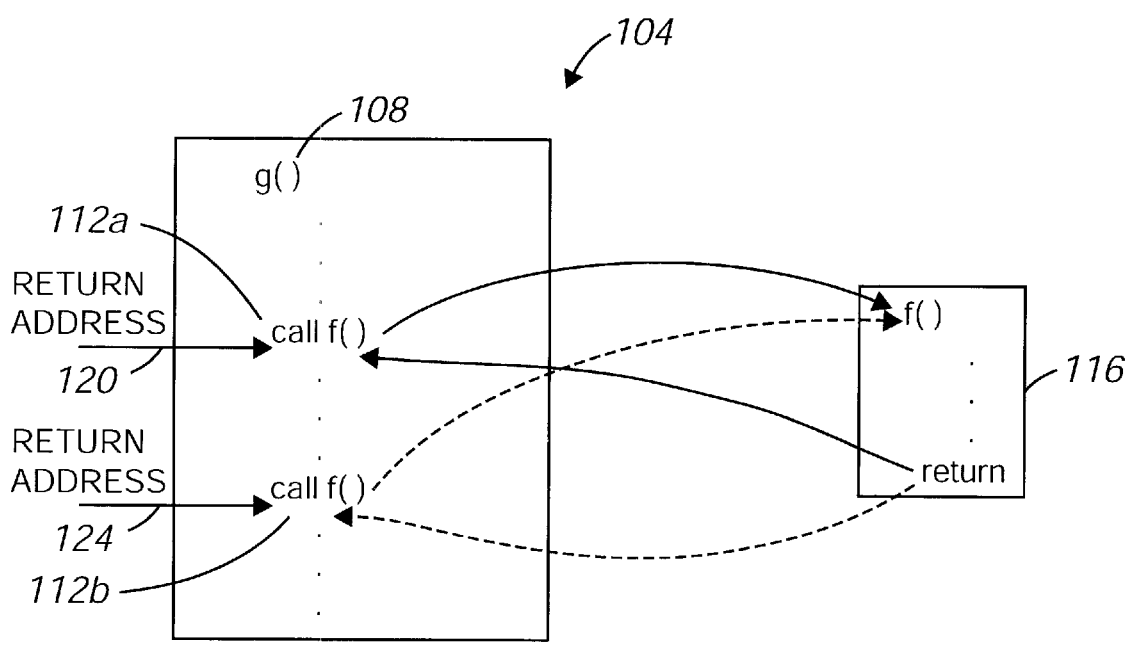
FIG. 1 is a diagrammatic representation of computer code which calls an external method.
Figure 2A:
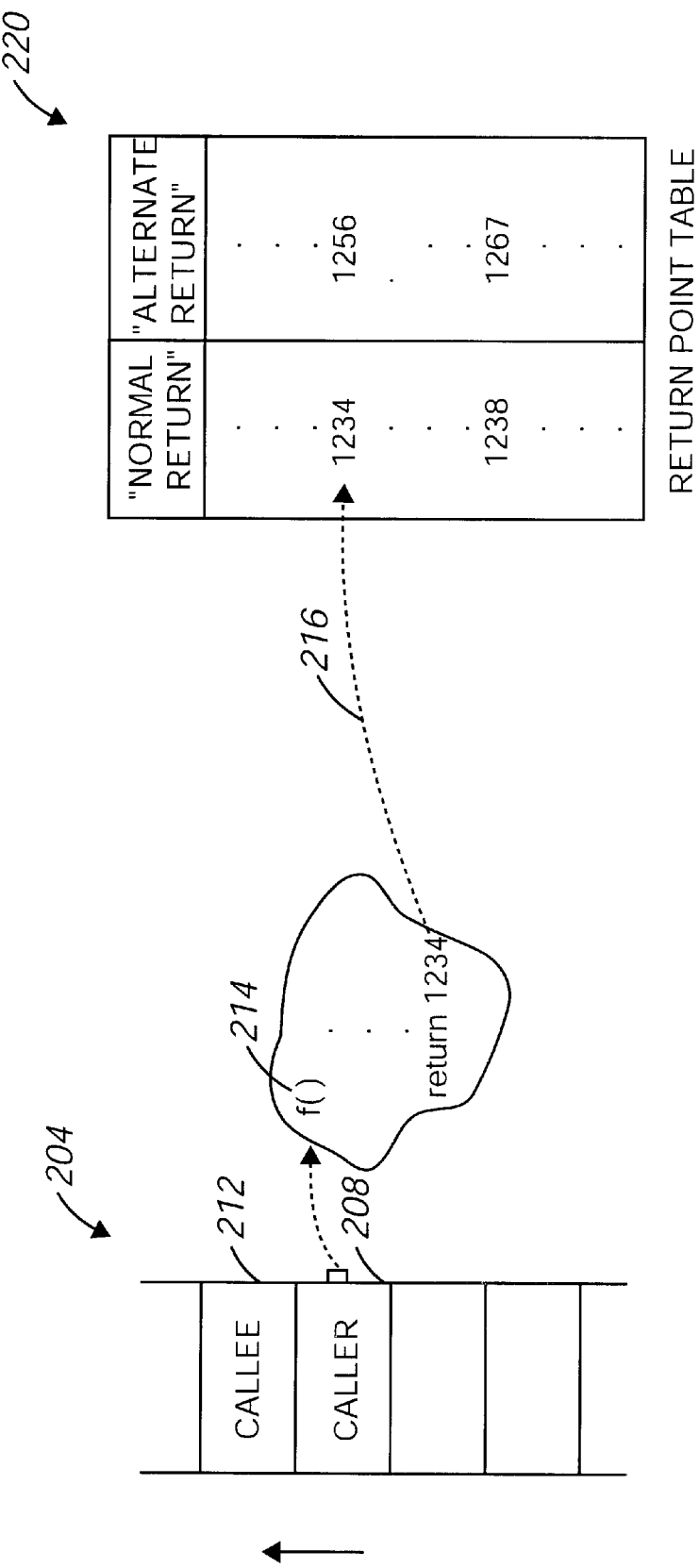
FIG. 2a is a diagrammatic representation of a call stack and an associated return point table.
Figure 2B:
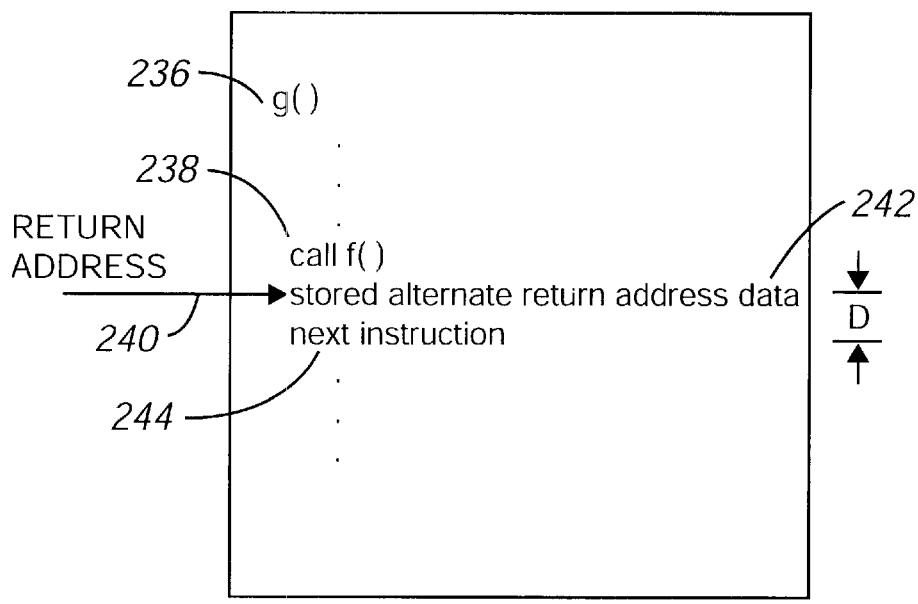
FIG. 2b is a diagrammatic representation of a computer routine which stores an alternate return address associated with a call to a function.
Figure 2C:
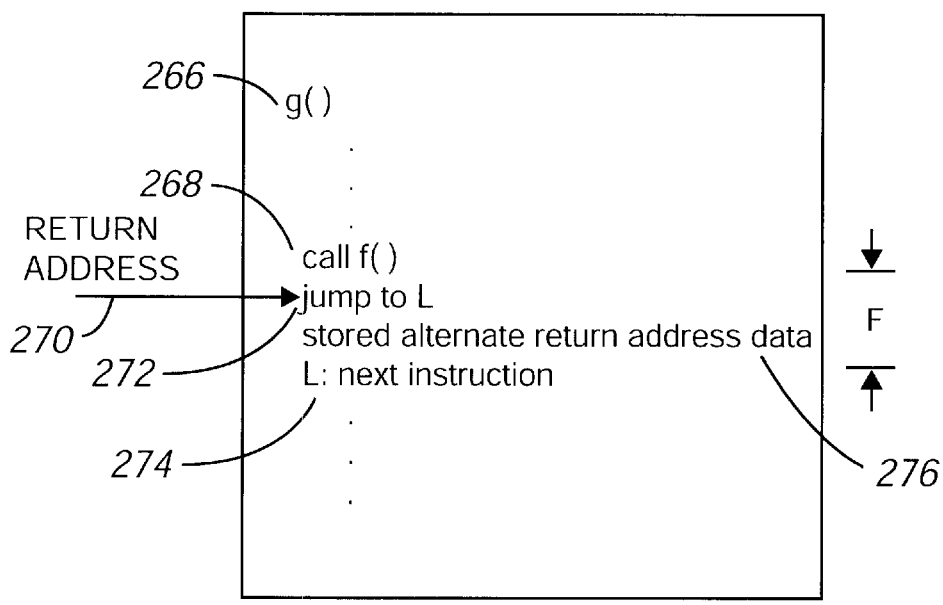
FIG. 2c is a diagrammatic representation of a computer routine which branches past a stored alternate return address associated with a call to a function.

When a function which is called by a computer program is about to return to the computer program, the function may return to any one of a plurality of return sites, or points. By way of example, a function may return normally, or as expected. Alternatively, a function may return in an alternate manner, e.g., abnormally. Abnormal return sites which correspond to abnormal returns, must generally be stored such that they may be readily accessed.

Some implementations which accommodate returns from a function to different points within a program store addresses for alternate return sites in look-up tables. Implementing a table look-up to locate an alternate return address is often slow. Other implementations which accommodate returns to different sites explicitly store data relating to alternate return addresses near a call to the function from which a return is being made. Such implementations which involve explicitly storing data near a call generally either require extra space overhead, incur hardware performance penalties, or adversely affect normal returns.

In order to implement multiple returns from function calls without incurring performance penalties or significantly compromising the efficiency of any returns, data for addresses corresponding to returns may be embedded in an instruction which essentially performs no "useful" operation. That is, an instruction which has substantially no dependencies and typically executes with very little overhead, e.g., less overhead than the execution of a jump, may be used to encode alternate return addresses. An instruction which essentially has no dependencies and normally executes with insignificant overhead is generally considered to be a "dummy" instruction. Such instructions include, but are not limited to, instructions such as a move instruction or a test instruction.

A move instruction is generally used to move data into a register or stack location. By way of example, a move instruction arranged to move a constant into an unused register may have a syntax such as:

mov constant, unused_reg where "unused_reg" may be any register not presently containing a useful value, and "constant" may include data such as either an alternate return address. A test instruction sets processor flags depending on the value of a register, and may have the following syntax:

tst constant, reg where "reg" may be any register and "constant" may include data associated with an alternate return address.

Since the execution of a dummy instruction typically requires an insignificant amount of computational overhead, executing a dummy instruction when a return from a function call is normal does not adversely affect the overall performance of a computer system. In other words, executing a dummy instruction when it is not needed generally has substantially no affect on the performance of a computer system. Therefore, the implementation of dummy instructions for use with function calls which may result in alternate returns is relatively fast and efficient regardless of whether the return is a normal return or an alternate return.

Figure 3A:
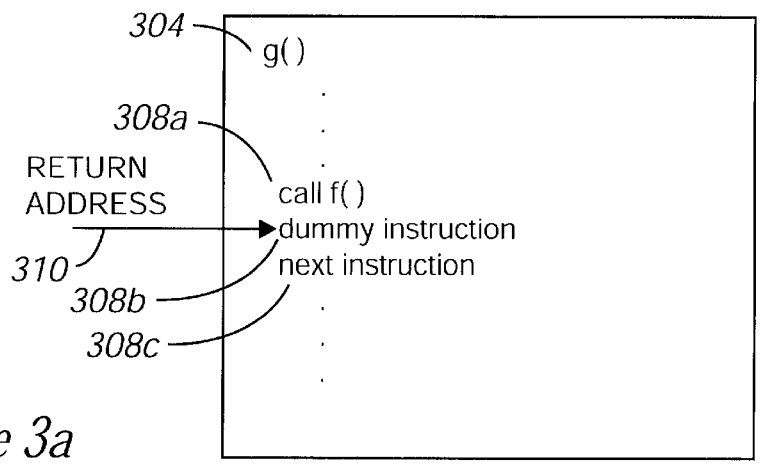
FIG. 3a is a diagrammatic representation of a computer routine which executes a dummy instruction after a call to a function in accordance with an embodiment of the present invention.

A dummy instruction may generally be located anywhere within a program or a routine. By way of example, a dummy instruction may be located immediately after a call to a function within a routine. With reference to FIG. 3a, the inclusion of a dummy instruction after a call to a function within a routine will be described in accordance with an embodiment of the present invention. A routine g( ) 304 generally includes instructions 308. A call 308a to a function f( ) may either return normally or abnormally.

When call 308a to function f( ) returns, the return is made to a location in routine g( ) 304 which is specified by a return address 310. Return address 310 identifies a dummy instruction 308b. Dummy instruction 308b is generally located at a fixed offset, e.g., four bytes, from call 308a to function f( ).

In one embodiment, when call 308a to function f( ) returns normally, then dummy instruction 308b executes, using essentially no overhead, especially on modern superscalar central processing units (CPUs) that may execute multiple independent instruction per cycle, as will be appreciated by those skilled in the art. Alternatively, when call 308a to function f( ) returns to the alternate return point, it reads the bytes comprising dummy instruction 308b and extracts the alternate return address encoded in dummy instruction 308b. Subsequently, execution then returns to this alternate return point, thereby completing the alternate return.

After dummy instruction 308b executes, using essentially no overhead, as discussed above, a subsequent, or next, instruction 308c in routine g( ) 304 executes. It should be appreciated that instructions 308 are typically both preceded by and followed by many other instructions.

In one embodiment, a call to a function may have more than one alternate, or abnormal, return. For example, a call to a function may be associated with multiple possible exceptions, as will be described in more detail below with respect to FIGS. 5a and 5b. When more than one abnormal return is possible, then multiple dummy instructions may be included near a function call such that each abnormal return address has an associated dummy instruction. Multiple dummy instructions may also be implemented in the event that a single dummy instruction is insufficient for holding all relevant data in a register, or stack location.

Figure 3B:
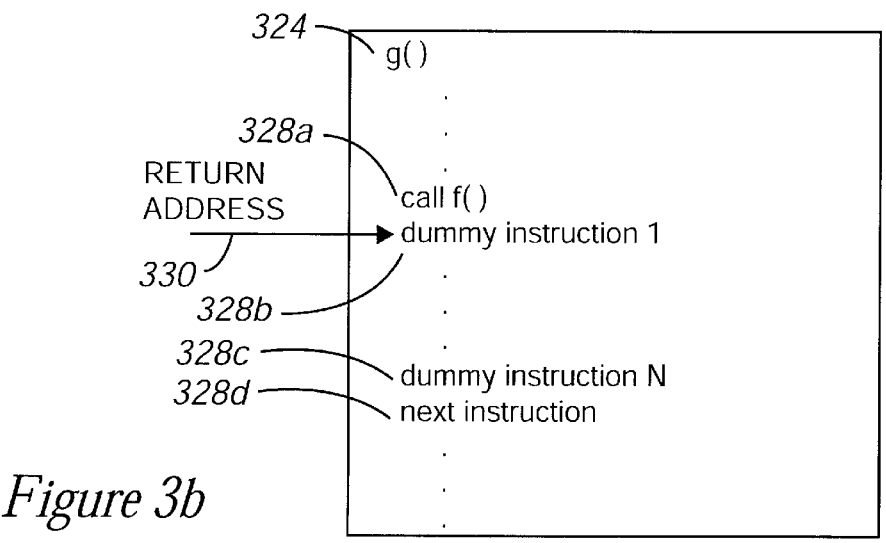
FIG. 3b is a diagrammatic representation of a computer routine which executes multiple dummy instructions after a call to a function in accordance with an embodiment of the present invention.

FIG. 3b is a diagrammatic representation of a computer routine which executes multiple dummy instructions after a call to a function in accordance with an embodiment of the present invention. As shown, routine g( ) 324 includes instructions 328. Instructions 328 may be located anywhere within routine g( ) 324. In other words, instructions 328 may be located near the beginning of routine g( ) 324, in the middle of routine g( ) 324, or substantially at the end of routine g( ) 324. When a call 328a to a function f( ) returns, the return is made to a location identified by a return address 330. Return address 330 identifies a first dummy instruction 328b. After first dummy instruction 328b executes, dummy instructions which follow first dummy instruction 328b are executed. Finally, an "Nth" dummy instruction 328c is executed.

Each dummy instruction, e.g., dummy instructions 328b, 328c, is generally located at a fixed offset from call 328a such that the dummy locations may easily be located with respect to call 328a. The overall execution of all dummy instructions uses very little overhead, as each dummy instruction, individually, uses essentially no overhead. A subsequent, or next, instruction 328d executes after "Nth" dummy instruction 328c executes.

Figure 3C:
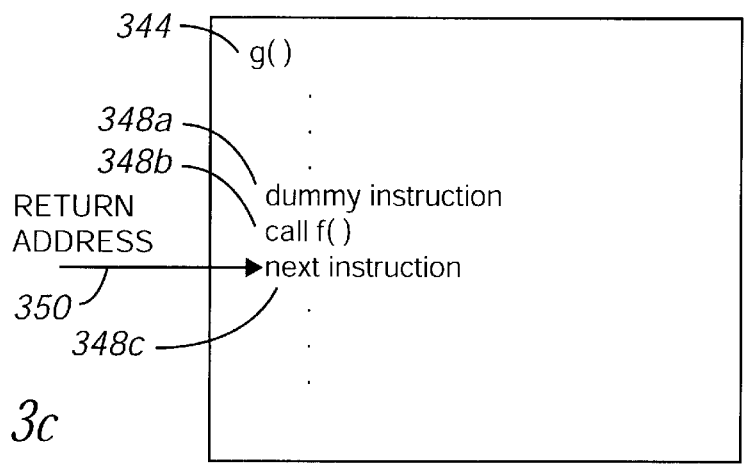
FIG. 3c is a diagrammatic representation of a computer routine which executes a dummy instruction before a call to a function in accordance with an embodiment of the present invention.

In general, a dummy instruction is not necessarily located after a call to a function which has multiple return sites. Dummy instructions may also be positioned before a call to a function with multiple return sites. With reference to FIG. 3c, the insertion of a dummy instruction before a call to a function within a routine will be described in accordance with an embodiment of the present invention. As shown, routine g( ) 344 includes a call to a dummy instruction 348a, which precedes a call 248b to a function f( ). Dummy instruction 348a is located at a fixed offset from call 248b to function f( ). That is, each time dummy instruction 348a precedes call 248b to function f( ) within routine g( ) 344, dummy instruction 348a is at the same offset with respect to call 248b to function f( ). In one embodiment, the offset is four bytes, although the offset may generally be widely varied. When call 348b to function f( ) returns, the return is made to the location identified by a return address 350. In the described embodiment, the location identified by return address 350 includes an instruction 348a.

Figure 4:
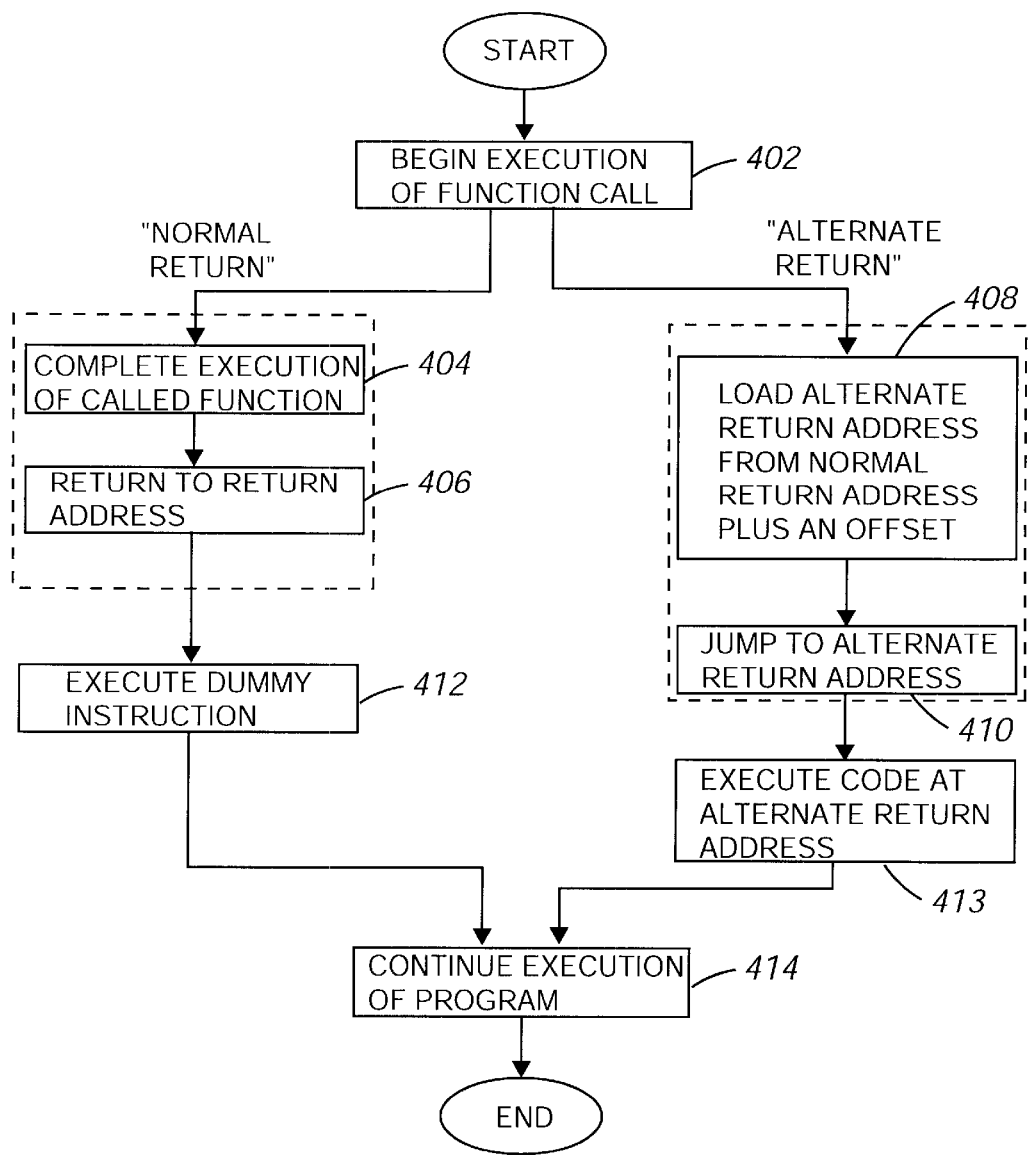
FIG. 4 is a process flow diagram which illustrates the steps associated with the execution of a routine which includes a function call with a plurality of return points in accordance with an embodiment of the present invention.

Referring next to FIG. 4, the steps associated with generally executing a function call in the course of the execution of a routine contained in a program will be described in accordance with an embodiment of the present invention. As will be appreciated by those skilled in the art, a routine which is executing may eventually reach a function call. In step 402, the execution of a function called by a routine begins. During the course of the execution of the function, conditions which arise determine whether the call to the function will result in a normal return or in an abnormal, or alternate, return.

When the execution of the called function in step 402 results in a normal return, then process flow branches to step 404 in which the execution of the called function is completed. After the execution of the called function is completed, the function returns to the location specified by the return address, i.e., the normal return address, in step 406. In the described embodiment, the location specified by the return address contains a dummy instruction, e.g., a dummy instruction as shown in FIG. 3a. In general, a dummy instruction may be any suitable approximately "no-overhead" instruction which embeds a constant without changing the internal states associated with the overall execution of a program. Dummy instructions may include, but are not limited to, a move instruction and a test instruction, as previously described.

The routine continues to execute after the dummy instruction executes in step 412. In general, the continued execution of the routine may involve the execution of various instructions, such as additional function calls and returns. When no instructions remain to be executed, the execution of the routine is completed.

Returning to the execution of the called function in step 402, when the execution of the called function is such that an alternate, e.g., abnormal, return is required, then from step 402, process flow proceeds to step 408 where an alternate return address is loaded from memory. Specifically, in one embodiment, the alternate return address is loaded from the normal return address augmented by an offset.

Once the alternate return address is loaded, a jump is made from the function to the location identified by the alternate return address in step 410. A dummy instruction is treated as "data" when performing a return to an alternate address, thereby exploiting the fact that bits representing an instruction may also be regarded as a binary value. By way of example, a processor may encode the following instruction:

mov #1234, reg1 which moves a hexadeximal constant "1234," which may be an alternate return address, into a register "reg1" as a byte sequence "5B 00 00 12 34." Although the instruction encoding may vary between different processor types, any encoding will essentially identify all parts of the instruction, including the instruction type, e.g., "move," the first operand, e.g., the constant "1234," and the second operand, e.g., the register "reg1."

A compiler arranges for a dummy instruction to contain the alternate return address as the first operand of a dummy move instruction, as mentioned above. Therefore, with knowledge of the format of an instruction, information such as the value of a constant, e.g., an alternate return address, may be obtained by reading bytes two through five of the instruction as an integer value.

As will be appreciated by those skilled in the art, the dummy instruction forms a kind of pattern, where some of the instruction bits are fixed and some are variable. The fixed bits may generally not be varied because the instruction would otherwise be expensive to execute, or have side effects that interfere with the normal execution of the program. By way of example, some fixed bits may indicate the instruction type, such as "move." The variable bits in the instruction may be used to encode an arbitrary value such as the address of the alternate return point, By way of example, in the dummy instruction "5B 00 00 12 34," the byte "5B" may be the fixed part, indicating a move to register "reg1," and "00 00 12 34" may be the variable part. In general, the variable part of a dummy instruction may consist of substantially any combination of its instruction bits, including multiple non-consecutive parts, depending upon the particular machine instruction set used.

From step 410, after a jump is made to the alternate return address, then process flow proceeds to step 413 where code associated with the alternate return address is executed. Then, the execution of the program continues at step 414 until execution is completed.

Figure 5A:
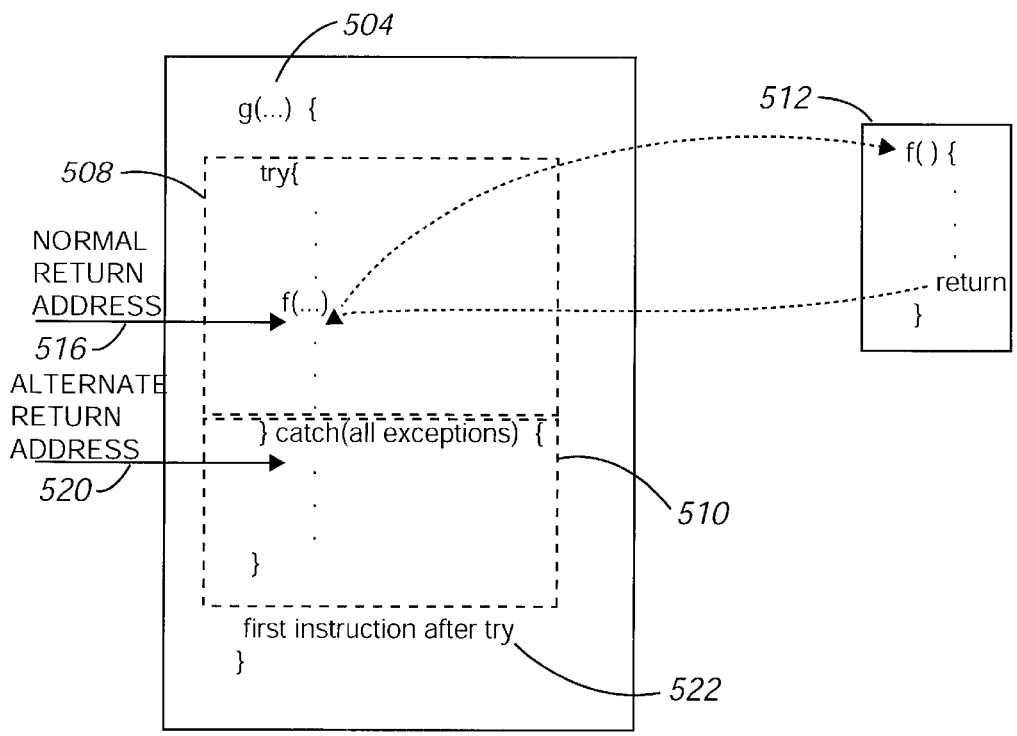
FIG. 5a is a diagrammatic representation of a function call which returns normally in accordance with an embodiment of the present invention.
Figure 5B:
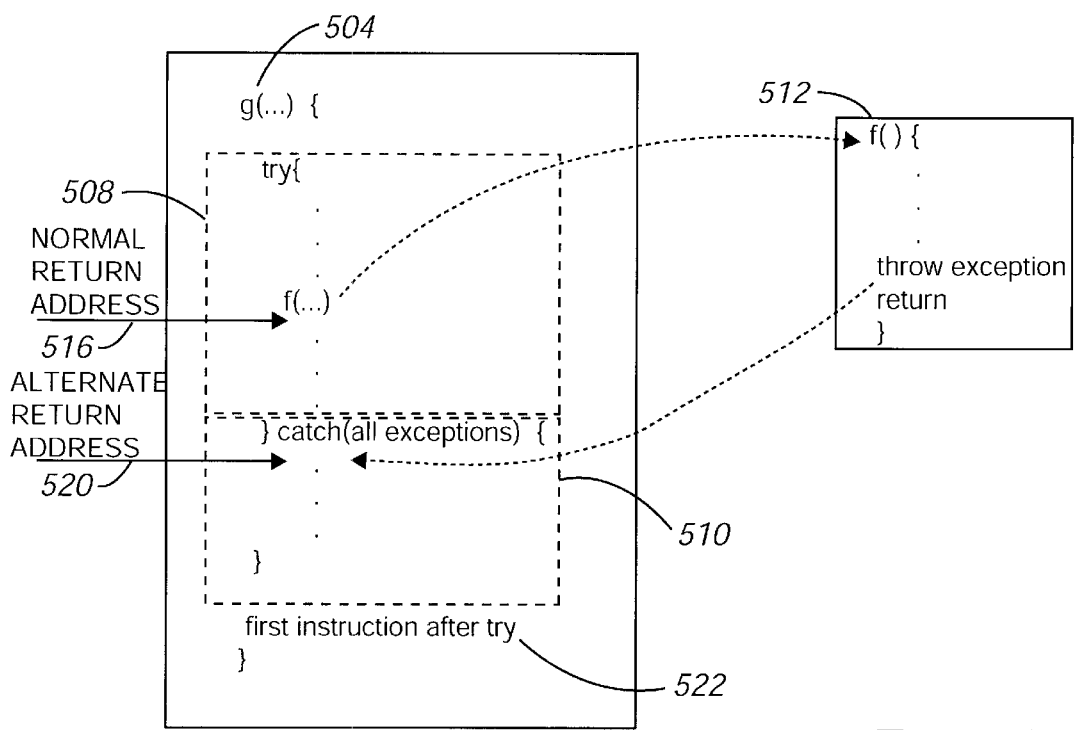
FIG. 5b is a diagrammatic representation of the function call which results in a thrown exception and returns abnormally in accordance with an embodiment of the present invention.

Multiple return address are useful to implement a variety of programming language mechanisms. By way of example, dummy instructions may be used to facilitate the execution of routines which have function calls that may throw exceptions. When a called function throws an exception, the exceptions generally may not be handled by the called function. Rather, the caller of the function handles exceptions thrown by the function. FIGS. 5a and 5b are a diagrammatic representation of a function which may either return normally or throw an exception and, hence, return abnormally in accordance with an embodiment of the present invention. A routine g( ) 504 includes a try block 508 that calls a function f( ) 512. Routine g( ) 504 further includes an exception handler 510 that is arranged to handle, or process, exceptions which arise during the execution of function try 508.

When function f( ) 512 is called, and returns normally, e.g., no exception is thrown by function f( ) 512, function f( ) 512 returns to try block 508 as shown in FIG. 5a. Specifically, function f( ) 512 returns to the location in try block 508 that is identified by a normal return address 516. In the described embodiment, the location identified by normal return address 516 is a dummy instruction, as described above with reference to FIG. 3a.

When the execution of function f( ) 512 results in an exception being thrown, as shown in FIG. 5b, function f( ) 512 returns to exception handler 510. That is, when an exception is thrown by function f( ) 512, a return is made to a location specified by an alternate return address 520 which identifies an instruction associated exception handler 510.

After exception handler 510 processes the exception thrown by function f( ) 512, function f( ) 512 eventually continues execution at a first instruction 522 after try block 508. The dummy instruction, in one embodiment, is an instruction such as a move instruction or a test instruction that enables alternate return address 520 to be stored within the instruction stream.

Figure 6:
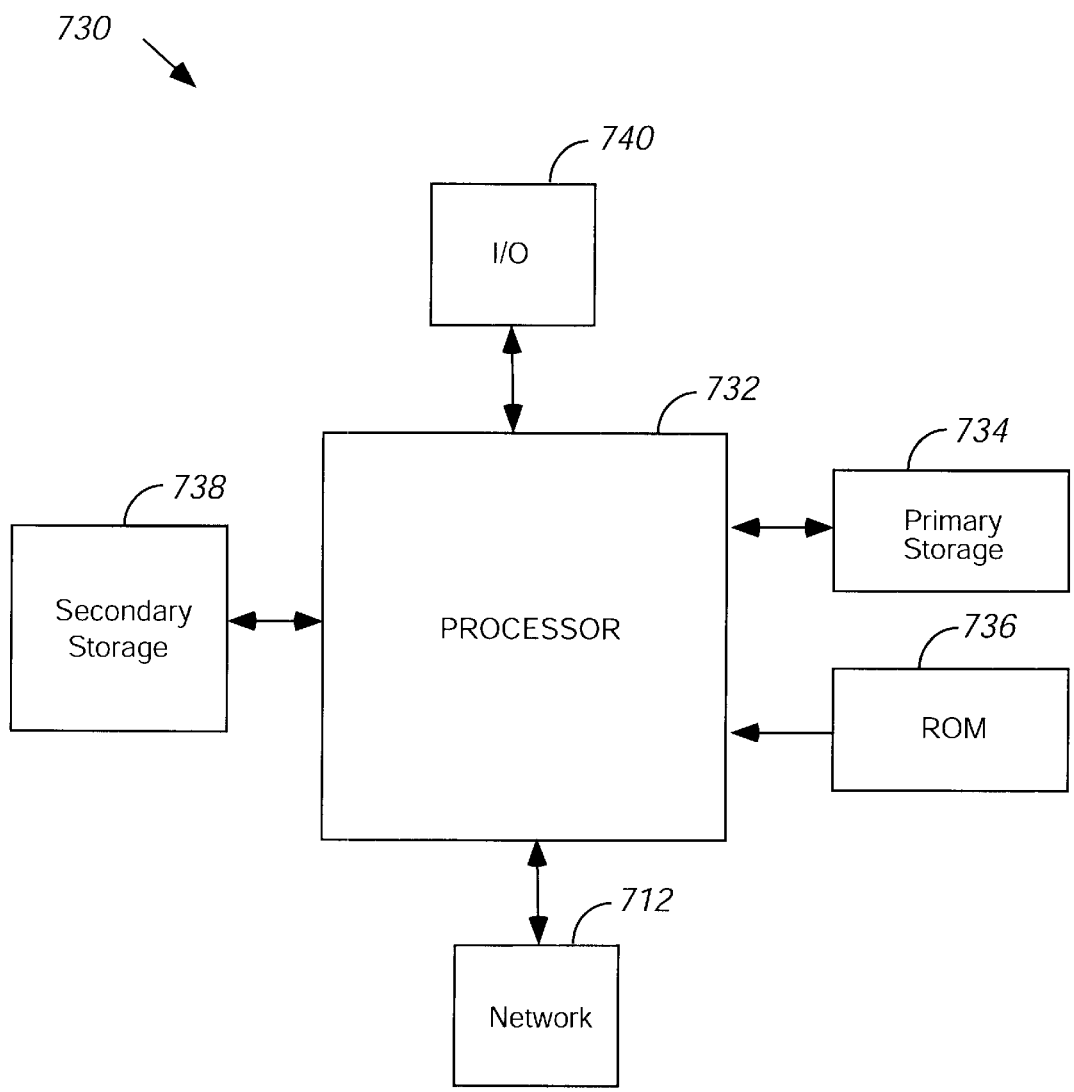
FIG. 6 is a diagrammatic representation of a computer system suitable for implementing the present invention.

The present invention may generally be implemented on any suitable computer system. Specifically, the multiple return points may as described above may be implemented using any suitable virtual machine, such as the virtual machine described below with respect to FIG. 7. FIG. 6 illustrates a typical, general purpose computer system suitable for implementing the present invention. The computer system 730 includes any number of processors 732 (also referred to as central processing units, or CPUs) that are coupled to memory devices including primary storage devices 734 (typically a read only memory, or ROM) and primary storage devices 736 (typically a random access memory, or RAM).

Computer system 730 or, more specifically, CPU 732, may be arranged to support a virtual machine, as will be appreciated by those skilled in the art. One example of a virtual machine that is supported on computer system 730 will be described below with reference to FIG. 7. As is well known in the art, ROM acts to transfer data and instructions uni-directionally to the CPU 732, while RAM is used typically to transfer data and instructions in a bi-directional manner. CPU 732 may generally include any number of processors. Both primary storage devices 734, 736 may include any suitable computer-readable media. A secondary storage medium 738, which is typically a mass memory device, is also coupled bi-directionally to CPU 732 and provides additional data storage capacity. The mass memory device 738 is a computer-readable medium that may be used to store programs including computer code, data, and the like. Typically, mass memory device 738 is a storage medium such as a hard disk or a tape which is generally slower than primary storage devices 734, 736. Mass memory storage device 738 may take the form of a magnetic or paper tape reader or some other well-known device. It will be appreciated that the information retained within the mass memory device 738, may, in appropriate cases, be incorporated in standard fashion as part of RAM 736 as virtual memory. A specific primary storage device 734 such as a CD-ROM may also pass data uni-directionally to the CPU 732.

CPU 732 is also coupled to one or more input/output devices 740 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 732 optionally may be coupled to a computer or telecommunications network, e.g., a local area network, an internet network, or an intranet network, using a network connection as shown generally at 712. With such a network connection, it is contemplated that the CPU 732 might receive information from the network, or might output information to the network in the course of performing the above-described method steps. Such information, which is often represented as a sequence of instructions to be executed using CPU 732, may be received from and outputted to the network, for example, in the form of a computer data signal embodied in a carrier wave. The above-described devices and materials will be familiar to those of skill in the computer hardware and software arts.

Figure 7:
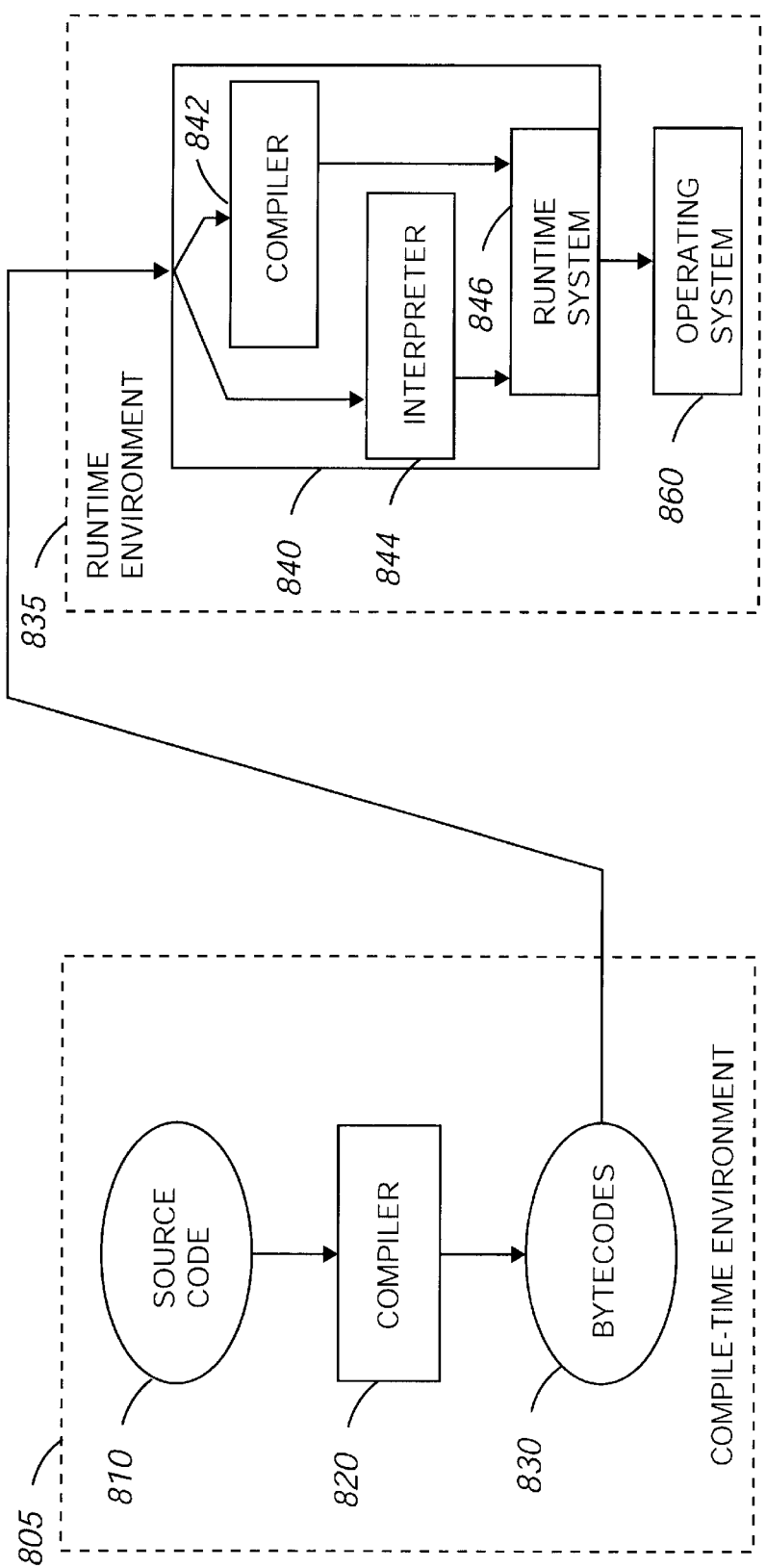
FIG. 7 is a diagrammatic representation of a virtual machine which is suitable for implementing the present invention.

As previously mentioned, a virtual machine may execute on computer system 730. FIG. 7 is a diagrammatic representation of a virtual machine which is supported by computer system 730 of FIG. 7, and is suitable for implementing the present invention. When a computer program, e.g., a computer program written in the Java™ programming language developed by Sun Microsystems of Mountain View, Calif., is executed, source code 810 is provided to a compiler 820 within a compile-time environment 805. Compiler 820 translates source code 810 into byte codes 830. In general, source code 810 is translated into byte codes 830 at the time source code 810 is created by a software developer.

Byte codes 830 may generally be reproduced, downloaded, or otherwise distributed through a network, e.g., network 712 of FIG. 6, or stored on a storage device such as primary storage 734 of FIG. 6. In the described embodiment, byte codes 830 are platform independent. That is, byte codes 830 may be executed on substantially any computer system that is running a suitable virtual machine 840. By way of example, in a Java™ environment, byte codes 830 may be executed on a computer system that is running a Java™ virtual machine.

Byte codes 830 are provided to a runtime environment 835 which includes virtual machine 840. Runtime environment 835 may generally be executed using a processor such as CPU 732 of FIG. 7. Virtual machine 840 includes a compiler 842, an interpreter 844, and a runtime system 846. Byte codes 830 may generally be provided either to compiler 842 or interpreter 844.

When byte codes 830 are provided to compiler 842, methods contained in byte codes 630 are compiled into machine instructions, as described above. On the other hand, when byte codes 830 are provided to interpreter 844, byte codes 830 are read into interpreter 844 one byte code at a time. Interpreter 844 then performs the operation defined by each byte code as each byte code is read into interpreter 844. In general, interpreter 844 processes byte codes 830 and performs operations associated with byte codes 830 substantially continuously.

When a method is called from an operating system 860, if it is determined that the method is to be invoked as an interpreted method, runtime system 846 may obtain the method from interpreter 844. If, on the other hand, it is determined that the method is to be invoked as a compiled method, runtime system 846 activates compiler 842. Compiler 842 then generates machine instructions from byte codes 830, and executes the machine-language instructions. In general, the machine-language instructions are discarded when virtual machine 840 terminates. The operation of virtual machines or, more particularly, Java™ virtual machines, is described in more detail in *The Java™ Virtual Machine Specification* by Tim Lindholm and Frank Yellin (ISBN 0-201-63452X), which is incorporated herein by reference in its entirety.

Although only a few embodiments of the present invention have been described, it should be understood that the present invention may be embodied in many other specific forms without departing from the spirit or the scope of the invention. By way of example, although the present invention has generally been described in terms of having two return points, the present invention may also be implemented for calls to functions which have more than two return points. In general, a dummy instruction may be added in a computer routine for each return point associated with a called function.

Some machine instruction sets are limited to 32 bits in length, which is generally not sufficient to encode the full 32-bit or 64-bit value that may be needed to represent a complete return address. In this case, it may not be possible to construct dummy instructions that directly encode a 32-bit or 64-bit value. However, the present invention may still be applied to provide rapid access to an alternate return point. Instead of encoding the alternate return address directly in the dummy instruction, the distance between the normal return point and the alternate return point may be encoded. Given this distance value, the alternate return point may be readily computed by adding the distance to the normal return address. Alternatively, parts of the address in a dummy instruction may be encoded using multiple dummy instructions, as described above with respect to FIG. 3b. By way of example, a first dummy instruction may embed the first 16 bits of an alternate return address, while a second dummy instruction may embed the remaining 16 bits of a 32-bit value.

The steps associated with the execution of a program which includes functions that have multiple return points may generally be widely varied. For example, as described above with respect to FIG. 3c, a dummy instruction associated with a particular function call may precede the function call. In other words, a dummy instruction such as a move instruction or a test instruction may be executed prior to the function call which is associated with the dummy instruction without departing from the spirit or the scope of the present invention.

The use of multiple return points is suitable for use for a variety of different purposes. As described above, multiple return points may be used to facilitate the throwing of exceptions. Although only one example of how exceptions may be implemented in accordance with the present invention has been described, it should be appreciated that the implementation of exceptions may be widely varied without departing from the spirit or the scope of the present invention. The use of multiple return points may also be suitable for use in systems, e.g., a Smalltalk-based system, which utilize non-local returns. When multiple return points are used, the associated dummy instructions may all be located after a call to a function which has multiple return points. The dummy instructions may also all be located before the call to the function. Finally, the dummy instructions may be dispersed such that some of the dummy instructions are positioned before the call while others are positioned after the call. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for using a dummy instruction which has an embedded library value associated with a return point to identify one of a plurality of return points including an expected return point and an alternate return point, the computer-implemented method comprising:

calling a function from within a routine while the routine is executing, wherein the function is separate from the routine;

beginning an execution of the function;

returning to the routine from the execution of the called function at a return point associated with the dummy instruction;

when the execution of the called function returns normally such that the return point is an expected return point, then executing the dummy instruction using essentially no overhead;

when the execution of the called function requires an alternate return such that the return point is an alternate return point, then reading the embedded library value;

determining the alternate return point based only upon the reading; and executing an instruction in the routine at the return point.

2. A computer-implemented method as recited in claim 1 wherein the function returns to the routine as expected, the method further including:

completing the execution of the function before returning to the expected return point, the expected return point being arranged to identify the first instruction in the routine to be executed after the execution of the function is completed.

3. A computer-implemented method as recited in claim 2 further including continuing execution of the routine.

4. A computer-implemented method as recited in claim 1 wherein beginning the execution of the function includes loading the first alternate return point, wherein the first alternate return point is identified by an instruction located at a fixed offset from the expected return point.

5. A computer-implemented method as recited in claim 4 further including:

aborting the execution of the called function; and jumping to the first alternate return point identified by the instruction located at the fixed offset from the expected return point.

6. A computer-implemented method as recited in claim 4 wherein the instruction located at the fixed offset from the expected return point is an instruction that uses an insignificant amount of computational overhead and includes the embedded library value.

7. A computer-implemented method as recited in claim 4 wherein the instruction located at the fixed offset from the expected return point is the first instruction.

8. A computer-implemented method as recited in claim 1 wherein when the first instruction in the routine that is executed when the function returns normally, the computer-implemented method further includes:

loading the first alternate return point identified by an instruction located at a fixed offset from the expected return point when the function does not return normally, wherein loading the first alternate return includes extracting the first alternate return point from the embedded library value.

9. A computer-implemented method for storing data associated with one of a plurality of return points to enable the data associated with the one of the plurality of return points to be efficiently obtained, the plurality of return points including an expected return point and at least a first alternate return point, the computer-implemented method comprising:

executing a routine, the routine being arranged to call a function which is not a part of the routine;

calling the function from within the routine while the routine is executing;

beginning an execution of the function;

returning from the function to the routine, wherein the function accesses a first instruction in the routine, the first instruction in the routine being located substantially at the expected return point, the first instruction including data associated with the one of the plurality of return points;

executing the first instruction in the routine when the function returns as expected, wherein executing the first instruction uses insignificant computational overhead and does not affect execution of the routine;

accessing an embedded library value associated with the first instruction to calculate the first alternate return point when the function does not return as expected and returns as a first unexpected return; and executing a second instruction in the routine at the first alternate return point when the function does not return as expected and returns as the first unexpected return, wherein when the function does not return as expected and returns as the first unexpected return, the first instruction is not executed.

10. A computer-implemented method as recited in claim 9 wherein the first instruction is one of a test instruction and a move instruction.

11. A computer-implemented method as recited in claim 9 further including jumping to the first alternate return point.

12. A computer-implemented method as recited in claim 9 wherein accessing the embedded library value associated with the first instruction includes loading the library value that identifies the first alternate return point from the expected return point.

13. A computer-implemented method as recited in claim 9 further including:
accessing bytes associated with a third instruction to identify a second alternate return point when the function does not return as expected and returns as a second unexpected return, the third instruction being located at an offset from the expected return point, the third instruction being arranged to execute using insignificant computational overhead; and
executing a fourth instruction in the routine at the second alternate return point when the function does not return as expected and returns as the second unexpected return, wherein when the function does not return as expected and returns as the second unexpected return, the first instruction and the third instruction are not executed.

14. A computer-implemented method as recited in claim 13 further including executing the third instruction when the function returns as expected.

15. A computer program product for storing data associated with one of a plurality of return points to enable the data associated with the one of the plurality of return points to be efficiently obtained, the plurality of return points including an expected return point and at least a first alternate return point, the computer program product comprising:
computer code for executing a routine, the routine being arranged to call a function which is not a part of the routine;
computer code for calling the function from within the routine while the routine is executing;
computer code for beginning an execution of the function;
computer code for returning from the function to the routine, wherein the function accesses a first instruction in the routine, the first instruction in the routine being located substantially at the expected return point, the first instruction including data associated with the one of the plurality of return points;
computer code for executing the first instruction in the routine when the function returns as expected, wherein executing the first instruction uses insignificant computational overhead and does not affect execution of the routine;
computer code for accessing an embedded library value associated with the first instruction to determine the first alternate return point when the function does not return as expected and returns as a first unexpected return;

computer code for executing a second instruction in the routine at the first alternate return point when the function does not return as expected and returns as the first unexpected return, wherein when the function does not return as expected and returns as the first unexpected return, the first instruction is not executed; and
a computer-readable medium that stores the computer codes.

16. A computer program product as recited in claim 15 wherein the computer code for accessing the embedded library value associated with the first instruction includes computer code for loading bytes that the embedded library value to identify the first alternate return point from the expected return point.

17. A computer program product as recited in claim 15 further including:
computer code for accessing bytes associated with a third instruction to identify a second alternate return point when the function does not return as expected and returns as a second unexpected return, the third instruction being located at an offset from the expected return point, the third instruction being arranged to execute using insignificant computational overhead; and
computer code for executing a fourth instruction in the routine at the second alternate return point when the function does not return as expected and returns as the second unexpected return, wherein when the function does not return as expected and returns as the second unexpected return, the first instruction and the third instruction are not executed.

18. A computer program product for using a dummy instruction associated with a return point containing an embedded library value to identify one of a plurality of return points including an expected return point and an alternate return point, the computer program product comprising:
computer code for calling a function from within a routine while the routine is executing, wherein the function is external to the routine;
computer code for beginning an execution of the function;
computer code for returning to the routine from the execution of the called function at a return point associated with the dummy instruction;
when the execution of the called function returns normally such that the return point is an expected return point, then
executing the dummy instruction using essentially no overhead;
when the execution of the called function requires an alternate return such that the return point is an alternate return point, then
reading the embedded library value;
determining the alternate return point based only upon the embedded library value;
computer code for executing an instruction in the routine at the return point; and
a computer-readable medium that stores the computer codes.

* * * * *